Dec. 9, 1930.  D. I. REITER  1,784,389

SHIFTABLE FASTENER

Filed April 27, 1929

INVENTOR
Daniel I. Reiter
BY
ATTORNEY

Patented Dec. 9, 1930

1,784,389

UNITED STATES PATENT OFFICE

DANIEL I. REITER, OF NEW YORK, N. Y.

SHIFTABLE FASTENER

Application filed April 27, 1929. Serial No. 358,456.

This invention relates to pronged fastener elements of the type adapted to be secured to a piece of fabric such as a carpet, and intended to cooperate with another fastener element for securing the fabric or carpet in place.

In such pronged fastener elements which I will hereinafter refer to as "carpet fasteners", it is customary to provide a hollow stud, which is formed by drawing out the material at the central portion of a plate, to the desired shape. The stud, at the end where it joins the plate, is therefore open. This results in a substantially central aperture or stud opening in the plate communicating with the inside of the stud.

Improvements in this type of fastener have been devised, in which the stud plate or stud flange is so supported that it may shift or automatically adjust itself transversely for allowing the stud to enter a socket which may be inaccurately aligned therewith. Such inaccuracies are often occasioned, for example, by inaccurate setting of the stud element in the carpet, or by reason of the stretching or shrinkage of the carpet.

I have found that the shiftable stud fasteners previously devised are often prevented from shifting into alignment with the socket element into which they are to be inserted, for the reason that the user, by pressing on the carpet to insert the stud into place, presses a portion of the carpet directly against the stud and into the stud opening thereof, and thereby so presses the carpet and stud together as to prevent relative movement thereof.

I have obviated this difficulty by so securing the stud plate in place that no direct pressure preventing movement thereof can be put thereon by the user. This I accomplish by so protecting the stud opening that the carpet cannot be pressed thereinto, and thereby prevent binding or jamming of the stud against the carpet.

The various objects of my invention will be clear from the description which follows, and from the drawings, in which, Fig. 1 is a top plan view of one form of my improved fastener element.

In that practical embodiment of my invention which I have illustrated by way of example, I provide a pronged member designed to guide and support the stud for transverse shifting movement relatively thereto in all directions, and so shaped as to cover the stud opening, thereby preventing the entrance of the thumb of the user, or of any part of the carpet into the stud opening.

Figure 1:
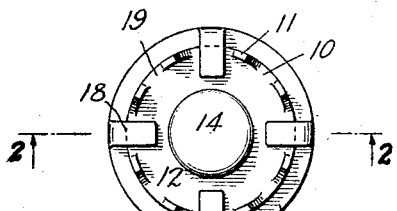
Figure 2:
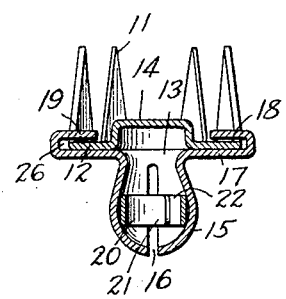
Fig. 2 is a vertical section thereof, taken on the line 2—2 of Fig. 1.
Figure 3:
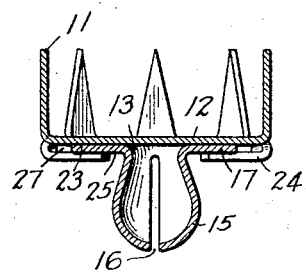
Fig. 3 is a vertical section of a modified form of my invention wherein the means for supporting and guiding the stud plate are differently arranged.
Figure 4:
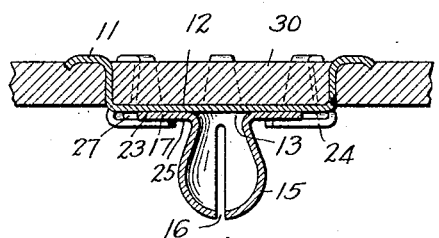
Fig. 4 is a similar view thereof, showing the fastener secured in place to a carpet.
Figure 5:
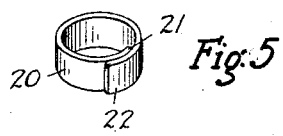
Fig. 5 is a perspective view of my improved collapsible bracing means for the stud.

Referring to Figs. 1 and 2, the carpet fastener plate 10 is provided with outstanding spaced prongs 11 of the usual type. The prong-carrying guiding and supporting plate 12 is arranged preferably substantially at right angles to the prongs 11 and is imperforate throughout, for the purpose of covering and protecting the stud opening 13. The plate 12 may be made entirely flat throughout, if desired (as illustrated in Figs. 3 and 4) or said plate may be upraised at its central portion as 14, to provide a finger piece, pressed by the finger or thumb of the user through the intermediary of the carpet 30, for exerting pressure upon the stud to force it into the socket. By means of the upraised portion 14, a pressure member spaced from the prongs 11 is provided, on which pressure in a line coaxially of the plate 12 may be exerted, and the finger of the user kept from contact with the sharp edges of the prongs 11, which contact may result in injury.

The stud portion of my improved fastener element is preferably formed of a single piece of sheet material, the central portion of which is drawn downwardly to form the stud 15, and slotted as at 16 in about the usual manner. This results in forming the unavoidable stud aperture 13 in the stud member. The flange of the stud, or stud plate 17, is arranged parallel to the prong carrying plate 12. Various means may be used for holding said flange or stud plate 17 in contact with the stud plate so as to be supported and guided thereby, against relative axial movement, while allowing relative shifting or transverse movement. As shown in Figs. 1 and 2, a series of spaced lugs or extensions 18 are formed at the periphery of the stud plate, which lugs or extensions are bent upwardly and inwardly between the prongs 11 into more or less loose contact with the upper surface 19 of the prong carrying plate and extend inwardly past the prongs.

For bracing the slotted stud 15, I prefer to provide a collapsible cylindrical ring 20, the normal diameter of which is substantially that of or slightly less than the greatest interior diameter of the stud. The ends 21 and 22 of said ring are overlapped so that the outer diameter of said ring may decrease by the greater overlapping of said ends as the stud is constricted by the passage thereof in either direction into or out of a cooperating socket. The ring is sufficiently resilient to expand to its original or normal diameter when pressure thereon is removed. Said ring prevents injury or collapse of the stud under abnormal pressure, particularly if the stud and socket are materially out of alignment. The ring braces said stud, but is sufficiently resilient to allow the stud to yield as it is pressed into the socket, while aiding the stud to expand after it has entered the socket, thereby serving to removably hold the stud in place.

Referring now to Figs. 3 and 4, I have there shown the prong carrying plate 12, flat throughout and in contact with the upper face 23 of the stud flange 17. However, the extensions or lugs 18 are eliminated, and instead thereof, extensions or lugs 24 are substituted, said lugs being integral with the prong carrying plate 12.

Said lugs 24 may be formed from that part of the sheet from which the plate is made, and which lies between the prongs 11. The lugs 24 are bent downwardly and inwardly to support the under face 25 of the stud flange 17, and to prevent relative axial movement of the stud and the prong carrying plate 12, while allowing limited relative transverse movement thereof in all directions. It will be understood that as many of said lugs 18 and 24 may be provided as may be found convenient or desirable though I have shown four of such lugs in Fig. 1.

In order to insert the stud into a socket after the prongs 11 have been turned over on to the carpet or other piece of fabric, as illustrated in Fig. 4, the user may press on the carpet at a point in alignment with the axis of the pronged member without danger of jamming or binding the stud and thereby preventing the transverse shifting thereof, should the socket element be slightly out of alignment.

The prong carrying plate serves to support the carpet and to maintain the carpet in spaced relation to and above the stud opening 13 and to prevent the entrance of any portion of the carpet into said stud opening. The stud is thereby free to shift laterally in the grooves 26 or 27 as the case may be so as to align itself automatically with the socket and readily enter thereinto. The grooves 26 are provided between the lugs 18 and the stud plate 17 as shown in Fig. 2, while the grooves 27 are provided between the prong carrying plate 12 and the lugs 24 as shown in Figs. 3 and 4. In either case, the height of the grooves is substantially that of the thickness of the flange or plate inserted therein.

In order to provide said grooves 26 as shown in Fig. 2, the diameter of the stud plate or flange 17 is greater than the outer diameter of the prong carrying plate 12 whereby relative transverse movement of the members 12 and 17 is possible. Similarly, the outer diameter of the stud plate 17 as shown in Fig. 4, is less than the diameter of the prong carrying plate 12.

It will be seen that the user is able to apply pressure centrally of the pronged member without danger of preventing the stud from shifting; that the user need not press on the fastener element eccentrically thereof and thereby tend to injure his finger due to the sharp edges of the prongs 11, and that I have provided a shiftable fastener element well adapted to meet the severe requirements of practical use.

While I have shown and described certain specific embodiments of my invention, I do not wish to be understood as limiting myself thereto since I intend to claim my invention as broadly as may be permitted by the state of the prior art and the scope of the appended claims.

I claim:

1. In a prolonged carpet fastener element, a stud provided with an annular flange member having an opening therein, a plate member supporting and guiding said flange for transverse movement in all directions, said plate member closing said opening, spaced inwardly bent lugs on one of said members providing a groove for the reception of the other member, and edge prongs on said plate member adapted to be passed upwardly through a carpet and bent thereover, said prongs being arranged between the lugs and entirely above said flange member and extending in a direction opposite to the direction of the stud whereby the stud lies entirely below the carpet to which the element is attached.

2. The combination with a fastener member, adapted to enter a cooperating fastener element and having a central opening therein, of an attaching member loosely supporting said fastener member for relative transverse movement, and covering said opening to prevent the entrance thereinto under pressure of any portion of the material to which the attaching member is secured, edge prongs outstanding from that face of said attaching member opposite to that on which said fastener member is arranged and adapted to be passed through material arranged entirely on the pronged side of said attaching member, and spaced elements integral with one of said members and bent inwardly therefrom between the prongs adjacent one of the faces of the other member.

3. In a shiftable stud fastener, a centrally imperforate plate member, a stud member having a stud projecting therefrom in one direction, said members being assembled in approximately coaxial relation, and one of said members being of substantially less diameter than the other to provide a circumferential space therebetween, spaced elements on one of said members engaging the peripheral portion of the other of said members for guiding the stud member in its shifting movement relatively to the plate member but maintaining said members against relative axial movement, and spaced prongs on said plate member arranged between the spaced elements and projecting in the opposite direction.

4. A two-piece fastener element, comprising an imperforate plate member, spaced prongs outstanding upwardly from the edge of said plate member, a stud member arranged wholly below said plate member and said stud member having a stud thereon extending downwardly in a direction opposite to that of said prongs and said stud member being shiftable transversely relatively to said plate member and having an opening therein covered by said plate member, and inwardly bent spaced lugs arranged between the spaced prongs and associated with said members for guiding the stud member in its transverse movement, said lugs being integral with one of said members and having the end portions thereof spaced away from the remainder of the last mentioned member sufficiently to provide a groove for the reception of the other member, the outermost diameter of the groove being greater than the outermost diameter of said other member.

5. A two-piece carpet fastener element comprising an imperforate plate member, spaced prongs upstanding in one direction substantially perpendicular to said member, and lying wholly above said member, a transversely shiftable stud having a flat annular flange member thereon of less diameter than that of said plate member and having a substantially central opening therein covered by said plate member, said stud extending downwardly from its flange member in a direction opposite to that of said prongs, and spaced lugs bent from the peripheral edge of one of said members and arranged between the prongs to extend inwardly past the prongs and terminating near the stud for engaging the lower surface of said flange member, the terminal portions of said lugs being spaced from the adjacent part of the member from which they are bent a distance substantially equal to the thickness of the other of said members to provide a groove for transverse movement of said flange member relatively to said plate member, said plate member preventing the entrance of any part of the carpet into said opening under pressure and thereby protecting the stud for its transverse movement at all times.

6. A two-piece carpet fastener element comprising a stud having an annular flange member thereon provided with a central opening, an imperforate plate member arranged above and covering said opening and preventing the entrance of any part of the carpet to which the element is attached from entering said opening, one of said members being of greater diameter than the other of said members to provide a circumferential space therebetween, spaced prongs projecting upwardly from the extreme peripheral edge of said plate member and wholly above said stud and adapted to be passed upwardly through a carpet and to have the ends thereof bent into engagement with the carpet for maintaining said carpet entirely above said plate member and above all parts of said stud, and inwardly bent lugs projecting from the peripheral edge of one of said members for engaging the other of said members and for guiding said stud for movement relatively to said plate member transversely in all directions.

7. In a stud fastener element, a hollow stud, and a substantially cylindrical collapsible spring ring inserted into said stud and arranged coaxially therewith, said ring being split to provide free end portions normally overlapping.

8. In a stud fastener element, a hollow spring stud, and a split ring coaxially arranged within the stud, the free ends of the ring normally overlapping.

9. In a stud fastener element, the combination with a hollow stud of a split bracing ring arranged coaxially therein and partly collapsible radially on the constriction of the stud.

10. In a stud fastener element, an imperforate plate, prongs projecting upwardly from the edge of said plate, lugs bent downwardly and inwardly from the edge of said plate between the prongs, and in parallel spaced relation to the remainder of the plate, and a stud member having a downwardly projecting stud and a flange wholly below the plate and the prongs and shiftable transversely relatively thereto on the movement of the flange in the space between the lugs and the plate.

11. In a stud fastener element, the combination with a hollow stud of a sheet metal member in the form of a cylindrical ring having its ends movable relatively to each other and arranged coaxially of and within the stud.

12. In a stud fastener element, a sheet metal stud, and a cylindrical spring member of sheet material arranged coaxially of and within the stud for bracing said stud, said member having ends movable circumferentially of the member under radial stress on the stud.

13. In a two-piece shiftable stud fastener element, a stud having a flat flange thereon provided with an opening, a flat plate of greater diameter than the flange arranged above the flange and closing the opening, prongs upstanding from the plate in a direction opposite to that of the stud, and integral spaced lugs on the plate bent from the material between the prongs downwardly and inwardly and spaced from the flat portion of the plate a distance substantially equal to the thickness of the flange and terminating adjacent the stud, thereby provided a groove in which the flange may move transversely of the element.

14. In a two-piece shiftable stud fastener element, a stud having a flat flange thereon provided with an opening, and spaced lugs bent upwardly and inwardly into parallel spaced relation to the flange, a plate covering said opening and having its peripheral portion inserted between the lugs and the flange and spaced prongs extending from and integral with said plate between the lugs, said prongs being arranged intermediate the extremities of the lugs.

15. In a two-piece shiftable stud fastener element, a stud having a flange provided with an opening, and having integral spaced lugs bent into parallel spaced relation to the flange to provide a groove therebetween, a plate covering the opening and having its peripheral portion inserted into the groove for movement relatively to the stud, and spaced integral prongs on the plate projecting past the lugs and arranged therebetween.

16. In a two-piece stud fastener element, a plate having a flat centrally imperforate portion, integral spaced prongs upstanding from the said portion, and integral downwardly and inwardly bent lugs arranged in parallel spaced relation to and below the flat portion and between the prongs, and a stud having a flat flange provided with a central opening, said flange being inserted between the lugs and the flat portion of the plate for transverse movement therebetween, said stud being attachable by said prongs to the under face of a carpet and lying wholly below said face of the carpet when so attached whereby pressure on the carpet does not affect shifting of the flange and stud.

DANIEL I. REITER.